Figures 1, 2:
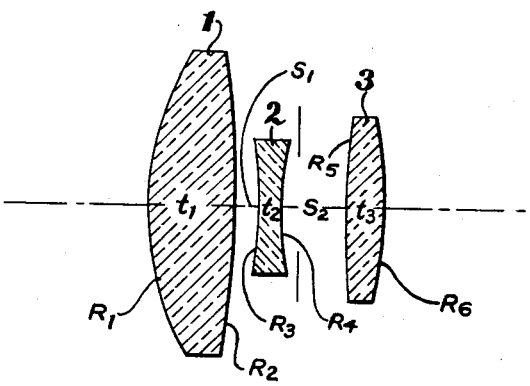

July 13, 1965           F. E. ALTMAN          3,194,116
TRIPLET OBJECTIVE HAVING A NEGATIVE ELEMENT FORMED
OF A COPLYMER OF ACRYLONITRILE AND STYRENE
Filed Dec. 22, 1961

| EQUIVALENT FOCAL LENGTH=100mm. | | | | f/8 |
|---|---|---|---|---|
| LENS | $N_D$ | V | RADII | THICKNESSES |
| 1 | 1.492 | 57.4 | $R_1$= +31.73mm. | $t_1$= 10.18 mm. |
|   |       |      | $R_2$= -103.3    | $S_1$= 2.73 |
| 2 | 1.564 | 36.6 | $R_3$= -47.14    | $t_2$= 2.31 |
|   |       |      | $R_4$= +40.25    | $S_2$= 7.84 |
| 3 | 1.492 | 57.4 | $R_5$= +350.6    | $t_3$= 4.63 |
|   |       |      | $R_6$= -38.76    |      |

*Fred E Altman*
INVENTOR.

BY
ATTORNEYS

United States Patent Office

3,194,116
Patented July 13, 1965

3,194,116
TRIPLET OBJECTIVE HAVING A NEGATIVE ELEMENT FORMED OF A COPOLYMER OF ACRYLONITRILE AND STYRENE
Fred E. Altman, Rochester, N.Y., assignor to Eastman Kodak Company, Rochester, N.Y., a corporation of New Jersey
Filed Dec. 22, 1961, Ser. No. 161,676
11 Claims. (Cl. 88—57)

This application is a continuation-in-part of my application Serial No. 15,644, filed March 17, 1960 now abandoned.

This invention relates to plastic lens elements.

The preferred embodiment thereof relates to photographic objectives of the type having three airspaced, simple elements, the outer ones of which are positive and the inner one of which is negative. Such a lens is usually called a "Cooke" triplet, and the type is widely used. It has the advantage of providing relatively good correction for aberrations in a simple construction using only three simple lens elements. Since triplets are relatively inexpensive but highly corrected, and since one of the advantages of plastic lenses is the low cost of manufacture, and assembly, the present invention is particularly applicable to triplet lenses.

The object of my invention is to provide a plastic negative lens element suitable for use in compound lenses.

It is a particular object of the preferred embodiment of the invention to provide such a plastic element which has the proper indices of refraction and dispersion to cooperate in a triplet with one or both of the two positive elements being of methylmethacrylate to give good correction of color and all other lens aberrations.

An object of a particular embodiment of my invention is to provide a highly corrected lens design which may be made up entirely of injection molded plastic elements with good mechanical and optical properties and which because of both the design and the use of injection molded plastics, is relatively inexpensive to manufacture.

Such a lens was never made prior to the present invention. The shortcomings of the prior efforts which were made will now be described.

In the case of glass lenses the choice of mechanically and physically satisfactory materials is wide, but the choice of plastics is relatively narrow. Various methacrylates including cyclohexyl-methacrylate and particularly methyl-methacrylate form excellent positive elements partly because injection molding thereof gives optical quality elements, but such plastics cannot be used in the negative elements of the same lens system since this would not permit achromatizing of the lens system. I have tried polystyrene as the negative lens with methylmethacrylate in the positive lenses of a triplet, but the dispersive index of polystyrene is too low to give optimum correction of the other aberrations when the lens is achromatic. When achromatization is obtained using styrene as the negative element, the overall length of the lens is too great to permit a reasonably wide field to be covered; if the lens is made shorter all aberrations including color become worse. I have also tried other plastics in the negative element. Benzyl methacrylate, mentioned in my U.S. Patent 2,430,550 and copolymers of methylmethacrylate with styrene have the desired intermediate V value (not as low as styrene), but both of these materials are unsuitable for injection molding. The former must be polymerized in the mold and so must the latter copolymer if striae are to be avoided. The net result of all such difficulties has been the impossibility of making a satisfactory (reasonably wide field) triplet or other compound lens entirely of injection molded plastics, prior to the present invention.

Thus, the primary object of the present invention is to solve the age old problem of making a high quality lens entirely of injection molded plastic elements.

By the present invention it is possible to make a moderate aperture ($f/8$ lens of wide angular field and good correction or to make a high aperture ($f/2.7$) lens with satisfactory correction over a useful field. In fact it is possible, for example, to make, entirely with inexpensive plastic elements, $f/8$ lenses covering 27° from the axis which are at least equal in picture taking quality to lenses made with glass.

Various features which have been found useful in the design of glass lenses can be applied with equal effect when the lenses are made of plastic. For example in some cameras it has been found desirable to gain added improvement by curving the film surface slightly, in the longer picture dimension, while employing a lens designed to have a curved field to match. This feature is employed in some embodiments of the present invention. Alternatively a field flattener can be added instead of curving the film plane; field flatteners are weak negative lenses immediately in front of the image plane. Also compensation for temperature changes may be provided by the mount described in patent application Serial No. 126,168 by C. Estes, filed July 24, 1961.

The use of plastic materials instead of glass in the manufacture of photographic objectives has many advantages. As mentioned above, some plastics may be injection molded to produce lens elements having accurately curved and highly polished surfaces and requiring a minimum of finishing operations. Such lens elements are of course much less expensive to produce than glass elements which must be ground and polished and then finished individually. Furthermore, the need for selective assembly is reduced greatly or eliminated; this both reduces assembly costs and permits automated assembly.

Not all transparent plastic materials are suitable for use in injection molding of lenses. Some copolymer mixtures tend to become non-homogeneous during manufacturing operations, resulting in such effects as striae, variations in index and poor surface quality, in the finished lenses. In the past, materials which are colored such as yellow or amber or which are slightly cloudy have not been considered suitable for lens materials for obvious reasons. In such cases I have found that the expected detrimental effects do exist but are sometimes effective only with positive lens elements. A satisfactory negative elements according to the present invention is made of a material which is too yellow in a positive lens. Any effective color in a camera lens is quite objectionable both because of the effect on color pictures and because of the added density. One known yellow material is a copolymer of styrene and acryonitrile having a published index of refraction of $N_D=1.564$. This material is available under various trade names, one of them being Bakelite C–11, which contains about 72% styrene and 28% acrylonitrile. It is yellowish in appearance and when used in drinking glasses, for example, a blue dye is added to counteract the yellowish appearance, but this further increases the optical density. This copolymer also tends to appear slightly cloudy in bulk. Copolymers of the same two materials, usually with higher percentages of acrylonitrile are well known as fibers and sheeting but are not generally molded into thick solids. They are not used in the present triplets since the higher V values are neither required nor desired. It is well known that $N_D$ changes at least approximately linearly with the percentage composition of either glass or plastic mixtures. My above mentioned experience and that of others, with copolymers of methylmethacrylate and styrene showed that V also varies in direct proportion to the percentage of each component. Thus any copolymer of acrylonitrile and styrene with a published $N_D$ of 1.564 will have the percentage composition required and will have a V value about 36.6. Increasing the acrylonitrile content lowers the $N_D$ and raises the V.

According to the present invention and contrary to all prior considerations given to such materials, copolymers of acrylonitrile and styrene are useful as a lens element, provided the lens element is a negative one. Negative lenses are thinner at the axis than at the margin which apparently reduces any adverse effect of the yellowish color and of any cloudiness. Clear and substantially or effectively colorless negative lens elements can be injection molded from copolymers of acrylonitrile and styrene even though this material in bulk is yellow. Blue dye may be added if neutral color is more essential than minimum density, but with or without the dye, such material is satisfactory as a negative lens element.

Furthermore I had the dispersive index V of the above-mentioned copolymer measured and found it to be about 37, one specific sample being 36.6 and another being 36.0. This copolymer remains homogeneous during injection molding and gives a uniform finished product with optical quality surfaces. Thus the copolymer of acrylonitrile and styrene when injection molded was found for the first time to have (1) adequate uniformity for optics, (2) the superior surface quality required by optics, (3) a useful dispersive index, one particular copolymer having exactly the dispersive index needed to cooperate with methylmethacrylate positive elements and (4) no objectionable color or cloudiness in negative elements even though it is yellow and slightly cloudy in bulk.

According to the preferred embodiment of my invention this copolymer is used as the negative elements of a triplet lens when a methylmethacrylate resin having an index of refraction $N_D = 1.492$ and an index of dispersion $V = 57.4$ is used in one or both of the positive elements.

The use of methylmethacrylate resin in optical lenses and prisms is not unknown but the present invention is the first time that the acrylonitrile styrene copolymer has been used in any lens element and it is useful provided the element is a negative one. Furthermore it is particularly advantageous when a positive element in the same objective is made of a methacrylate. It is this combination which gives the unusually high correction in a wide angle, moderate aperture, lens and which gives good correction in high aperture lenses. Specific examples are given below. In the design of triplet lenses, when the dispersive lens has a higher index of refraction than that of the collective lenses, the best corrections are obtained when the field is allowed to be slightly curved. This curvature is adequately overcome by curving the film surface in the long dimension or horizontal dimension when a square format is used, as is commonly done for glass lenses or by using a field flattener, all as discussed above. Various examples of triplet lenses incorporating my invention are given below including Example 1 which has an angular coverage which exceeds 33° from the axis with good illumination and acceptable corrections in the edges of the field, with an aperture of $f/8$. Such an objective is shown in section in FIG. 1 and a table of the radii and spacings is given in FIG. 2. The table is repeated below as Example 1, other examples at various apertures also being given.

Example 1

[F = 100 mm.  $f/8$]

| Lens | $N_D$ | V | Radii, mm. | Spacings, mm. |
|---|---|---|---|---|
| 1* | 1.492 | 57.4 | $R_1 = + 31.7$<br>$R_2 = -103.3$ | $t_1 = 10.1$<br>$s_1 = 2.7$ |
| 2** | 1.564 | 36.6 | $R_3 = - 47.1$<br>$R_4 = + 40.2$ | $t_2 = 2.3$<br>$s_2 = 7.8$ |
| 3* | 1.492 | 57.4 | $R_5 = +350.6$<br>$R_6 = - 38.8$ | $t_3 = 4.6$ |

*Methylmethacrylate.
**Copolymer acrylonitrile-styrene.

Example 2

[F = 100 mm.  $f/4.5$]

| Lens | $N_D$ | V | Radii, mm. | Spacings, mm. |
|---|---|---|---|---|
| 1 | 1.492 | 57.4 | $R_1 = + 32.4$<br>$R_2 = -145.0$ | $t_1 = 5.6$<br>$s_1 = 8.5$ |
| 2 | 1.564 | 36.6 | $R_3 = - 34.4$<br>$R_4 = + 32.2$ | $t_2 = 2.2$<br>$s_2 = 8.5$ |
| 3 | 1.492 | 57.4 | $R_5 = +122.4$<br>$R_6 = - 29.1$ | $t_3 = 9.2$ |

Example 3

[F = 100 mm.  $f/2.7$]

| Lens | $N_D$ | V | Radii, mm. | Spacings, mm. |
|---|---|---|---|---|
| 1 | 1.492 | 57.4 | $R_1 = +35.3$<br>$R_2 = -86.9$ | $t_1 = 23.0$<br>$s_1 = 6.7$ |
| 2 | 1.564 | 36.6 | $R_3 = -37.7$<br>$R_4 = +28.4$ | $t_2 = 7.8$<br>$s_2 = 6.7$ |
| 3 | 1.492 | 57.4 | $R_5 = +55.3$<br>$R_6 = -38.1$ | $t_3 = 24.2$ |

The above Example 3 and also Examples 6 and 7 below are useful for 8 mm. motion picture cameras made up in 13 mm. focal length.

Exampl 4

[F = 100 mm.  $f/4$]

| Lens | $N_D$ | V | Radii, mm. | Spacings, mm. |
|---|---|---|---|---|
| 1 | 1.492 | 57.4 | $R_1 = + 26.8$<br>$R_2 = -510.0$ | $t_1 = 8.7$<br>$s_1 = 3.4$ |
| 2 | 1.564 | 36.6 | $R_3 = -62.8$<br>$R_4 = + 27.2$ | $t_2 = 2.4$<br>$s_2 = 6.0$ |
| 3 | 1.492 | 57.4 | $R_5 = +71.0$<br>$R_6 = - 44.8$ | $t_3 = 7.6$ |

A field flattener for use with Example 4 is made of methylmethacrylate and has a radius of curvature on its front surface of −138.6 mm., an axial thickness of 3.2 mm., and a plano rear surface adjacent to the image plane.

Some advantage is found in making a triplet lens with the front element of methylmethacrylate and the negative element of the copolymer according to the invention, but using ordinary crown or barium crown glass in the rear positive element. The following are three examples thereof:

*Example 5*

[F=100 mm. f/4]

| Lens | $N_D$ | V | Radii, mm. | Spacings, mm. |
|---|---|---|---|---|
| 1 | 1.492 | 57.4 | $R_1=+\ 28.8$ | $t_1=9.5$ |
|   |       |      | $R_2=-201.0$  | $s_1=4.2$ |
| 2 | 1.567 | 36.0 | $R_3=-\ 50.5$ | $t_2=2.5$ |
|   |       |      | $R_4=+\ 29.9$ | $s_2=7.6$ |
| 3 | 1.523 | 58.6 | $R_5=+\ 99.2$ | $t_3=6.5$ |
|   |       |      | $R_6=-\ 41.4$ |           |

*Example 6*

[F=100 mm. f/2.7]

| Lens | $N_D$ | V | Radii, mm. | Spacings, mm. |
|---|---|---|---|---|
| 1 | 1.492 | 57.4 | $R_1=+37.2$ | $t_1=23.1$ |
|   |       |      | $R_2=-90.8$ | $s_1=6.7$ |
| 2 | 1.567 | 36.0 | $R_3=-40.7$ | $t_2=7.8$ |
|   |       |      | $R_4=+30.7$ | $s_2=6.7$ |
| 3 | 1.523 | 58.6 | $R_5=+56.5$ | $t_3=24.2$ |
|   |       |      | $R_6=-43.2$ |            |

*Example 7*

[F=100 mm. f/2.7]

| Lens | $N_D$ | V | Radii, mm. | Spacings, mm. |
|---|---|---|---|---|
| 1 | 1.492 | 57.4 | $R_1=+\ 42.6$ | $t_1=23.7$ |
|   |       |      | $R_2=-123.9$  | $s_1=6.9$ |
| 2 | 1.567 | 36.0 | $R_3=-\ 48.8$ | $t_2=7.6$ |
|   |       |      | $R_4=+\ 36.8$ | $s_2=6.9$ |
| 3 | 1.611 | 58.8 | $R_5=+\ 68.3$ | $t_3=24.9$ |
|   |       |      | $R_6=-\ 53.4$ |            |

The following lens is similar to Example 1, but is more highly corrected over a somewhat narrower field, namely 27° from the axis as compared to 31° in Example 1.

*Example 8*

[F=100 mm. f/8]

| Lens | $N_D$ | V | Radii, mm. | Spacings, mm. |
|---|---|---|---|---|
| 1 | 1.492 | 57.4 | $R_1=+\ 28.9$ | $t_1=7.8$ |
|   |       |      | $R_2=-394.0$  | $s_1=5.9$ |
| 2 | 1.567 | 36.0 | $R_3=-\ 56.7$ | $t_2=1.8$ |
|   |       |      | $R_4=+\ 31.8$ | $s_2=9.3$ |
| 3 | 1.492 | 57.4 | $R_5=+\ 99.0$ | $t_3=5.5$ |
|   |       |      | $R_6=-\ 40.8$ |           |

In FIG. 2 and in the above examples, the lens elements are numbered from front (long conjugate side) to rear, $N_D$ is the index of refraction of the lens material for the D line of the spectrum, and V is the dispersive index of the material. The radii of curvature are given by R with the subscripts corresponding to lens surfaces numbered from front to rear, which is the direction that light travels through the lens when used in a camera. The thicknesses of the lens elements $t$ and spacings $s$ are similarly numbered from front to rear. The + and − signs attached to the radii refer to surfaces convex and concave, respectively, to the front. For a lens having a focal length other than 100 mm. all linear dimensions may be scaled in the same ratio that the desired focal length bears to 100 mm.

Other copolymers of acrylonitrile and styrene can be used as negative lens elements, since in accordance with the present invention, the yellowish color becomes harmless, in such arrangements. The particular copolymer chosen in any particular lens will be one having the desired indices of refraction and dispersion to give the correction required. That is, such copolymers can be used in various forms of compound lenses. In triplets, the preferred copolymer is the one herein described since it has the indices required to cooperate with methylmethacrylate. Furthermore the invention is most useful with triplets since one of the primary purposes of using injection molded plastic lenses is to reduce manufacturing and assembly costs and among high quality compound lenses, the triplet is the least expensive and lends itself best to the inexpensive assembly methods made available by the use of plastic elements. Thus there is a peculiar cooperation in a number of aspects when triplet lenses employ this particular copolymer in the negative element. Thus the triplet lenses and particularly the wide angle f/8 triplet lenses constitute the preferred embodiments of my invention, namely preferred embodiments of plastic lenses using this particular copolymer of acrylonitrile and styrene in the negative element.

The above eight examples all constitute species of the preferred embodiment of my invention although Examples 5, 6 and 7 employ glass in the rear element.

It will be understood that variations and modifications can be effected within the spirit and scope of the invention as described hereinabove and as defined in the appended claims.

I claim:

1. A triplet lens comprising two positive elements of methylmethacrylate and, spaced and aligned between the positive elements, a negative element formed of a copolymer of acrylonitrile and styrene having an index of refraction $N_D$ about 1.56 and an index of dispersion V about 37.

2. A lens covering a field of wide angle corrected for spherical aberration, coma, and chromatic aberration, composed of three elements spaced along an axis and having their optical axes aligned, in which the two outer elements are positive and formed of methylmethacrylate plastic and the inner element is negative and formed of a copolymer of acrylonitrile and styrene having an index of refraction $N_D$ of 1.56.

3. An objective having approximately the following characteristics:

| Lens | $N_D$ | V | Radii | Spacings |
|---|---|---|---|---|
| 1 | 1.49 | 57 | $R_1=+\ .32f$ | $t_1=.10f$ |
|   |      |    | $R_2=-1.0f$   | $s_1=.03f$ |
| 2 | 1.56 | 37 | $R_3=-\ .47f$ | $t_2=.02f$ |
|   |      |    | $R_4=+\ .40f$ | $s_2=.08f$ |
| 3 | 1.49 | 57 | $R_5=+3.5f$   | $t_3=.05f$ |
|   |      |    | $R_6=-\ .39f$ |            | where $f$ is the focal length of the objective, the numbers in the first column refer to lens elements numbered from front to rear, lens element number 2 being negative and formed of a copolymer of acrylonitrile and styrene, $N_D$ is the index of refraction for the D line of the spectrum, V is the dispersive index, $R_1$ to $R_6$ are the radii of curvature of the refractive surfaces numbered from front to rear, + and − signs referring respectively to surfaces convex and concave to the front, $t_1$ to $t_3$ are the thicknesses of the elements, and $s_1$ and $s_2$ are the airspaces between the elements.

4. An objective having approximately the following characteristics:

| Lens | $N_D$ | V | Radii | Spacings |
|---|---|---|---|---|
| 1 | 1.49 | 57 | $R_1=+.35f$<br>$R_2=-.87f$ | $t_1=.23f$<br>$s_1=.07f$ |
| 2 | 1.56 | 37 | $R_3=-.38f$<br>$R_4=+.28f$ | $t_2=.08f$<br>$s_2=.07f$ |
| 3 | 1.49 | 57 | $R_5=+.55f$<br>$R_6=-.38f$ | $t_3=.24f$ | where $f$ is the focal length of the objective, the numbers in the first column refer to lens elements numbered from front to rear, lens element number 2 being negative and formed of a copolymer of acrylonitrile and styrene $N_D$ is the index of refraction for the D line of the spectrum, V is the dispersive index, $R_1$ to $R_6$ are the radii of curvature of the refractive surfaces numbered from front to rear, + and − signs referring respectively to surfaces convex and concave to the front, $t_1$ to $t_3$ are the thicknesses of the elements, and $s_1$ and $s_2$ are the airspaces between the elements.

5. An objective having approximately the following characteristics:

| Lens | $N_D$ | V | Radii | Spacings |
|---|---|---|---|---|
| 1 | 1.49 | 57 | $R_1=+.30f$<br>$R_2=-4.0f$ | $t_1=.08f$<br>$s_1=.06f$ |
| 2 | 1.57 | 36 | $R_3=-.57f$<br>$R_4=+.32f$ | $t_2=.02f$<br>$s_2=.09f$ |
| 3 | 1.49 | 57 | $R_5=+1.0f$<br>$R_6=-.41f$ | $t_3=.06f$ | where $f$ is the focal length of the objective, the numbers in the first column refer to lens elements numbered from front to rear, lens element number 2 being negative and formed of a copolymer of acrylonitrile and styrene $N_D$ is the index of refraction for the D line of the spectrum, V is the dispersive index, $R_1$ to $R_6$ are the radii of curvature of the refractive surfaces numbered from front to rear, + and − signs referring respectively to surfaces convex and concave to the front, $t_1$ to $t_3$ are the thicknesses of the elements, and $s_1$ and $s_2$ are the airspaces between the elements.

6. A triplet lens comprising, spaced and aligned, a front positive element of methylmethacrylate, a negative element of a copolymer of acrylonitrile and styrene having an index of refraction $N_D$ about 1.56 and an index of dispersion V about 37 and a rear positive element of glass with an index of refraction $N_D$ between 1.50 and 1.65 and an index of dispersion about 59.

7. An objective having approximately the following characteristics:

| Lens | $N_D$ | V | Radii | Spacings |
|---|---|---|---|---|
| 1 | 1.49 | 57 | $R_1=+.43f$<br>$R_2=-1.3f$ | $t_1=.24f$<br>$s_1=.07f$ |
| 2 | 1.57 | 36 | $R_3=-.49f$<br>$R_4=+.37f$ | $t_2=.08f$<br>$s_2=.07t$ |
| 3 | 1.61 | 59 | $R_5=+.68f$<br>$R_6=-.53f$ | $t_3=.25f$ | where $f$ is the focal length of the objective, the numbers in the first column refer to lens elements numbered from front to rear, lens element number 2 being negative and formed of a copolymer of acrylonitrile and styrene $N_D$ is the index of refraction for the D line of the spectrum, V is the dispersive index, $R_1$ to $R_6$ are the radii of curvature of the refractive surfaces numbered from front to rear, + and − signs referring respectively to surfaces convex and concave to the front, $t_1$ to $t_3$ are the thicknesses of the elements, and $s_1$ and $s_2$ are the airspaces between the elements.

8. A negative lens element formed of a copolymer of acrylonitrile and styrene having an index of refraction $N_D$ about 1.56 and an index of dispersion V about 37.

9. A compound lens entirely of plastic in which a positive element is formed of methylmethacrylate and a negative element is formed of a copolymer of acrylonitrile and styrene having an index of refraction $N_D$ about 1.56 and an index of dispersion V about 37.

10. A triplet lens comprising, spaced and aligned, a positive element of methylmethacrylate, a negative element of a copolymer of acrylonitrile and styrene having an index of refraction $N_D$ about 1.56 and an index of dispersion V about 37 and a positive element of glass with a refraction $N_D$ between 1.50 and 1.65 and an index of dispersion about 59.

11. A compound lens in which a positive element formed of methylmethacrylate is axially aligned with, and air spaced from, a negative element formed of a copolymer of acrylonitrile and styrene having an index of refraction $N_D$ about 1.56 and an index of dispersion V about 37.

References Cited by the Examiner
UNITED STATES PATENTS

| | | | |
|---|---|---|---|
| 2,388,869 | 11/45 | Reiss | 88—57 |
| 2,405,301 | 8/46 | Grey | 88—57 |
| 2,423,491 | 7/47 | Fairbank | 88—57 |
| 2,430,550 | 11/47 | Altman et al. | 88—57 |

JEWELL H. PEDERSEN, *Primary Examiner.*